(12) United States Patent
Katsuta

(10) Patent No.: US 9,022,367 B2
(45) Date of Patent: May 5, 2015

(54) CURVED SPRING AND SLIDE MECHANISM

(75) Inventor: Tetsuya Katsuta, Chiba (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 118 days.

(21) Appl. No.: 13/818,415

(22) PCT Filed: Aug. 26, 2011

(86) PCT No.: PCT/JP2011/069347
§ 371 (c)(1),
(2), (4) Date: Feb. 22, 2013

(87) PCT Pub. No.: WO2012/026598
PCT Pub. Date: Mar. 1, 2012

(65) Prior Publication Data
US 2013/0145873 A1 Jun. 13, 2013

(30) Foreign Application Priority Data

Aug. 27, 2010 (JP) .................................. 2010-191369

(51) Int. Cl.
| | |
|---|---|
| *F16F 1/18* | (2006.01) |
| *F16F 1/02* | (2006.01) |
| *F16F 3/02* | (2006.01) |
| *G06F 1/16* | (2006.01) |
| *H04M 1/02* | (2006.01) |

(52) U.S. Cl.
CPC ............. *F16F 1/18* (2013.01); *Y10T 74/18904* (2015.01); *F16F 1/025* (2013.01); *F16F 3/02* (2013.01); *G06F 1/1624* (2013.01); *H04M 1/0237* (2013.01)

(58) Field of Classification Search
USPC ....................... 267/158, 164, 165; 455/575.4; 361/679.01
See application file for complete search history.

(56) References Cited

U.S. PATENT DOCUMENTS

| | | | |
|---|---|---|---|
| 2007/0006421 A1 | 1/2007 | Park et al. | |
| 2009/0181734 A1 | 7/2009 | Kato et al. | |
| 2010/0237550 A1 | 9/2010 | Kubota | |
| 2012/0182672 A1* | 7/2012 | Duan et al. ............... | 361/679.01 |

FOREIGN PATENT DOCUMENTS

| | | |
|---|---|---|
| JP | 2007-013923 | 1/2007 |
| JP | 2007-016997 | 1/2007 |
| JP | 2008-082365 | 4/2008 |

(Continued)

OTHER PUBLICATIONS

Korean Office Action dated Apr. 1, 2014.
(Continued)

*Primary Examiner* — Melanie Torres Williams
(74) *Attorney, Agent, or Firm* — IPUSA, PLLC

(57) ABSTRACT

In a curved spring configured to generate, based on a relative approaching displacement of the one-side bearing section and the other-side bearing section in an approach/separation direction, an urging force in a separation direction in which a one-side bearing section and an other-side bearing section are separated from each other, a linear elastic body is provided to extend on a closed curve, which includes a one-side portion arranged along a circumferential direction of the one-side bearing section and an other-side portion arranged along a circumferential direction of the other-side bearing section, and to constitute elastic sections of two lines between the one-side portion and the other-side portion.

11 Claims, 13 Drawing Sheets

(56) References Cited

FOREIGN PATENT DOCUMENTS

| JP | 2008-312176 | 12/2008 |
| JP | 2009-049785 | 3/2009 |
| JP | 2009-133495 | 6/2009 |
| JP | 2009-171072 | 7/2009 |
| JP | 3155691 U | 11/2009 |
| JP | 3161848 U | 8/2010 |
| KR | 10-0242067 | 3/2000 |
| WO | WO 2008/142996 | 11/2008 |
| WO | WO 2009121229 A1 * | 10/2009 |
| WO | WO 2010/084859 | 7/2010 |

OTHER PUBLICATIONS

International Search Report mailed on Nov. 8, 2011.

* cited by examiner

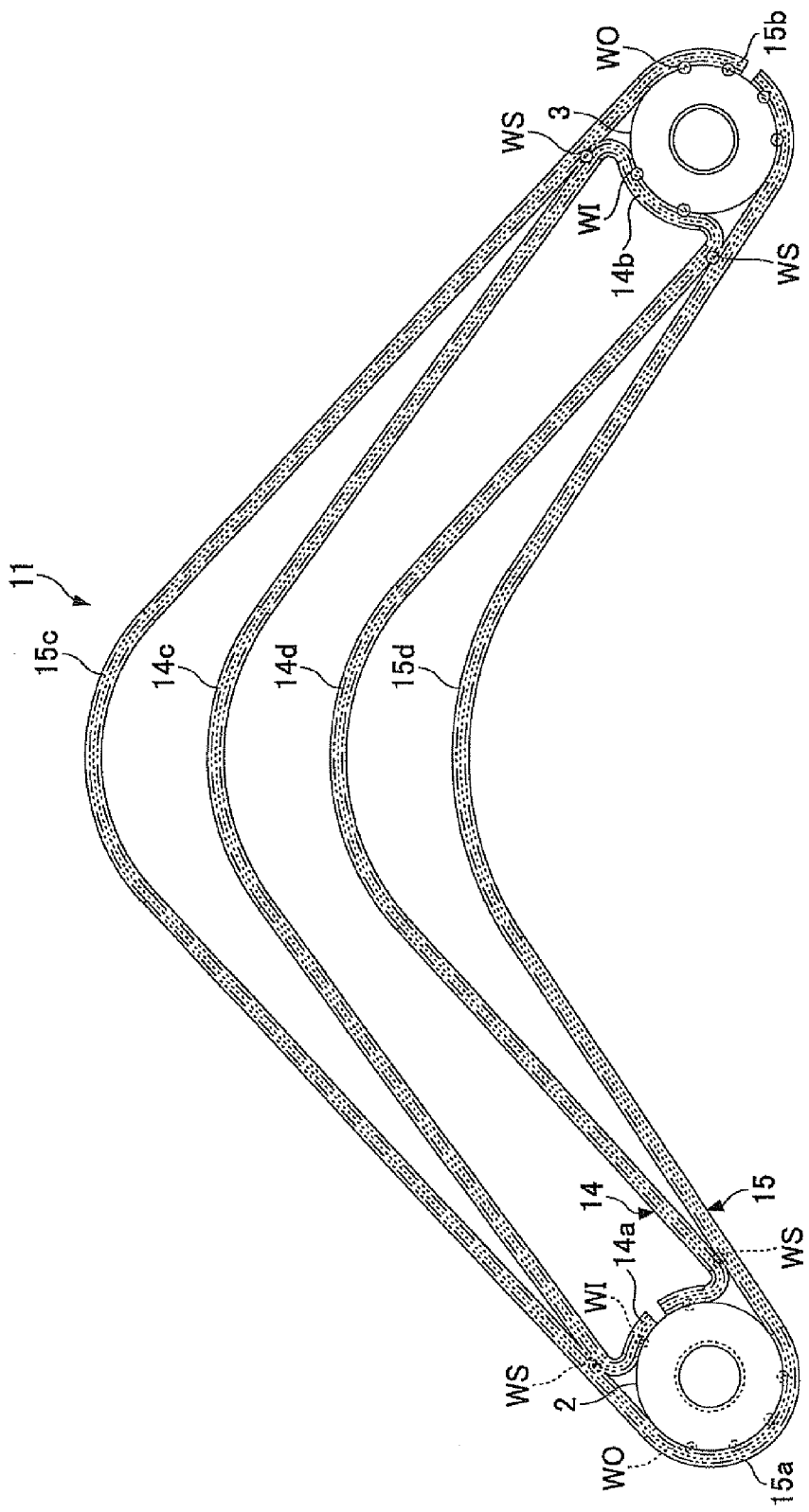

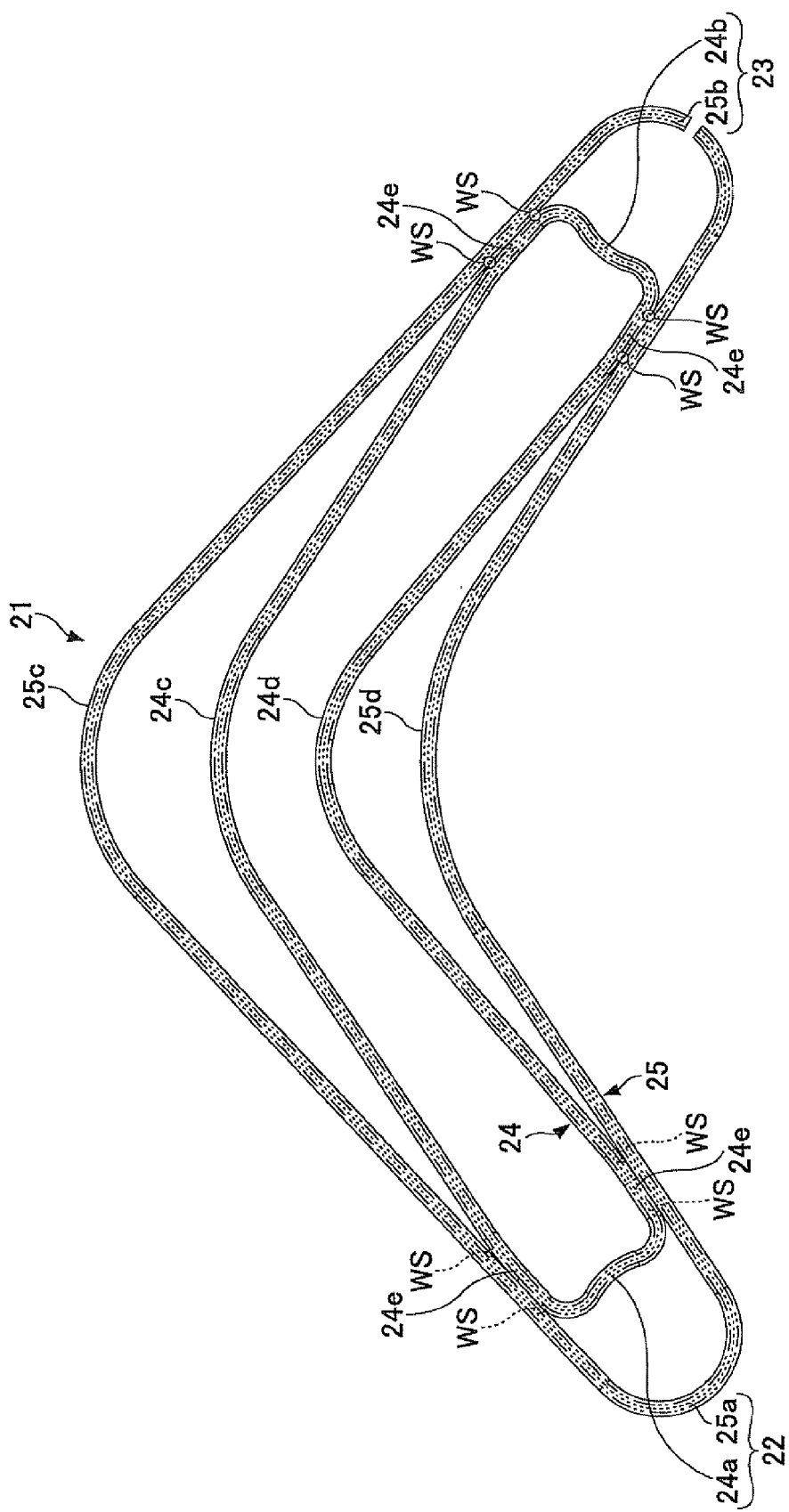

US 9,022,367 B2

CURVED SPRING AND SLIDE MECHANISM

TECHNICAL FIELD

The present invention relates to a slide mechanism causing a sub-body part to be slidable with respect to a main-body part in equipment having both the main-body and sub-body parts, such as, for example, a cellular phone, a portable terminal, etc., and a curved spring used for the slide mechanism.

BACKGROUND ART

In electronic equipment such as a cellular phone, etc., there is known to be equipment provided with a main-body part having a numeric keypad and a microphone, etc., a sub-body part having a liquid crystal device and a speaker, etc., and a slide mechanism which causes the sub-body part to slide relative to the main-body part, wherein the sub-body part is caused to move relative to the main-body part by a slide operation instead of a hinge operation.

In this electronic equipment, by causing the sub-body part, which is coupled to the main-body part, to slide relative to the main-body part, the speaker is caused to be positioned at a user's ear and the microphone is caused to be positioned at a user's mouth or jaw, or the numeric keypad is caused to be exposed so as to be juxtaposed to a display.

There exists an example, which is disclosed in Patent Document 1, of a slide mechanism used for this kind of electronic equipment. The slide mechanism recited in Patent Document 1 is provided with a spring including a plurality of lines (pieces) of linear spring of which one end being rotatably connected to the sub-body part and the other end being rotatably connected to the sub-body part. According to the biasing force of this spring, the slide mechanism provides a reaction force to an operation of a user in the first half of the sliding and provides an assist force to the operation of the user in the second half of the sliding.

PRIOR ART DOCUMENT

Patent Document

PATENT DOCUMENT 1: Japanese Laid-Open Patent Application No. 2009-133495

SUMMARY OF THE INVENTION

Problems to be Solved by the Invention

However, in the slide mechanism having such a structure, a size of fixing parts of the linear springs on one end and the other end of the spring is increased, which causes an interference with other parts in the electronic equipment to be a problem, and also generates a problem in that a freedom of arrangement is low. Moreover, in manufacturing the spring, there is generated a problem that a productivity is low because a process of binding up and fixing one end and the other end of the linear springs occurs.

Means to Solve the Problem

It is a general object of the present invention to provide improved and useful curved spring and slide mechanism in which the above-mentioned problems of the conventional technique are eliminated.

A more specific object of the present invention is to provide a curved spring and a slide mechanism of which freedom of arrangement in an interior of applicable electronic equipment is high and productivity is high.

In order to achieve the above-mentioned objects, the present invention provides a curved spring configured to generate, based on a relative approaching displacement of a one-side bearing section and an other-side bearing section in an approach/separation direction, an urging force in a separation direction in which said one-side bearing section and said other-side bearing section are separated from each other, the curved spring comprising a linear elastic body extending on a closed curve, which includes a one-side portion arranged along a circumferential direction of said one-side bearing section and an other-side portion arranged along a circumferential direction of said other-side bearing section so as to constitute elastic sections of two lines between said one-side portion and said other-side portion.

Additionally, in order to achieve the above-mentioned objects, the present invention provides a curved spring configured to generate, based on a relative approaching displacement of a one-side bearing section and an other-side bearing section in an approach/separation direction, an urging force in a separation direction in which said one-side bearing section and said other-side bearing section are separated from each other, the curved spring comprising a linear elastic body extending on a closed curve, which includes a one-side bearing portion forming a portion of said one-side bearing section and an other-side bearing portion forming a portion of said other-side bearing section so as to constitute elastic sections of two lines between said one-side bearing portion and said other-side baring portion.

Effect of the Invention

According to the present invention, a curved spring and a slide mechanism, of which a freedom of arrangement is high in an interior of an applicable electronic equipment and a productivity is high, can be provided.

BRIEF DESCRIPTION OF DRAWINGS

FIG. 7 is a plan view of a curved spring which is an embodiment 2.

FIG. 9 is a plan view of a curved spring which is an embodiment 3.

Figure 1:
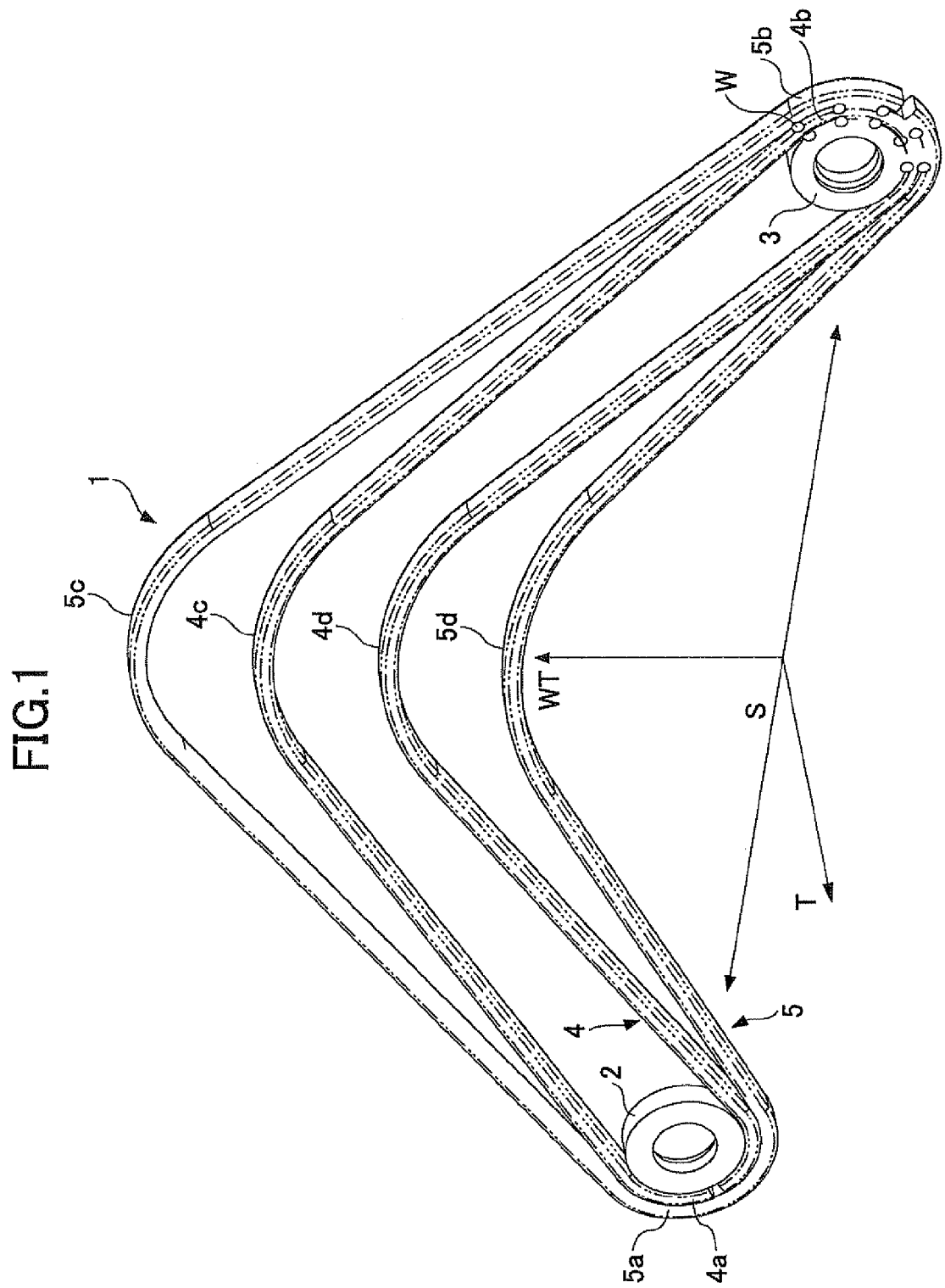
FIG. 1 is a perspective view of a curved spring which is an embodiment 1.

EXPLANATION OF REFERENCE NUMERALS 1 curved spring
2 ring (one-side bearing section)
3 ring (other-side bearing section)
4 linear spring (inner circumference side linear elastic body)
4a one-side portion
4b other-side portion
4c elastic section
4d elastic section
5 linear spring (outer circumference side linear elastic body)
5a one-side portion
5b other-side portion
5c elastic section
5d elastic section
6 base plate (base board)
7 slide plate (slide board)
8 pin
11 curved spring
14 linear spring (inner circumference side linear elastic body)
14a one-side portion
14b other-side portion
14c elastic section
14d elastic section
15 linear spring (outer circumference side linear elastic body)
15a one-side portion
15b other-side portion
15c elastic section
15d elastic section
21 curved spring
22 one-side bearing section
23 other-side bearing section
24 linear spring (inner side linear elastic body)
24a one-side bearing portion
24b other-side bearing portion
24c elastic section
24d elastic section
25 linear spring (outer circumference side linear elastic body)
25a one-side bearing portion
25b other-side bearing portion
25c elastic section
25d elastic section

MODE OF CARRYING OUT THE INVENTION

A description will be given, with reference to the drawings, of embodiments of the present invention.

EMBODIMENT 1

As illustrated in FIG. 1, a curved spring 1 of the embodiment 1 as a whole has an L-letter plane-plate-like bent configuration in which a center between left and right ends protrudes with respect to a line connecting the left and right ends, and forms a generally left-right symmetric boomerang shape. In FIG. 1, it has a generally annular-column-like ring 2 (one-side bearing section) on the left side and also has a generally annular-column-like ring 3 (other-side bearing section) on the right side. Although the ring 2 and the ring 3 are not limited in material, they are formed by a metal suitable for welding as mentioned later.

Illustrated in FIG. 1 is a form in a no-load state where no load is exerted on the curved spring 1. In FIG. 1, a line connecting the respective centers of the ring 2 and the ring 3 points a approach/separation direction S. An upward direction in FIG. 1 points a width direction WT which is perpendicular to the approach/separation direction S. A direction perpendicular to both the approach/separation direction S and the width direction WT points a thickness direction T.

Figure 2:
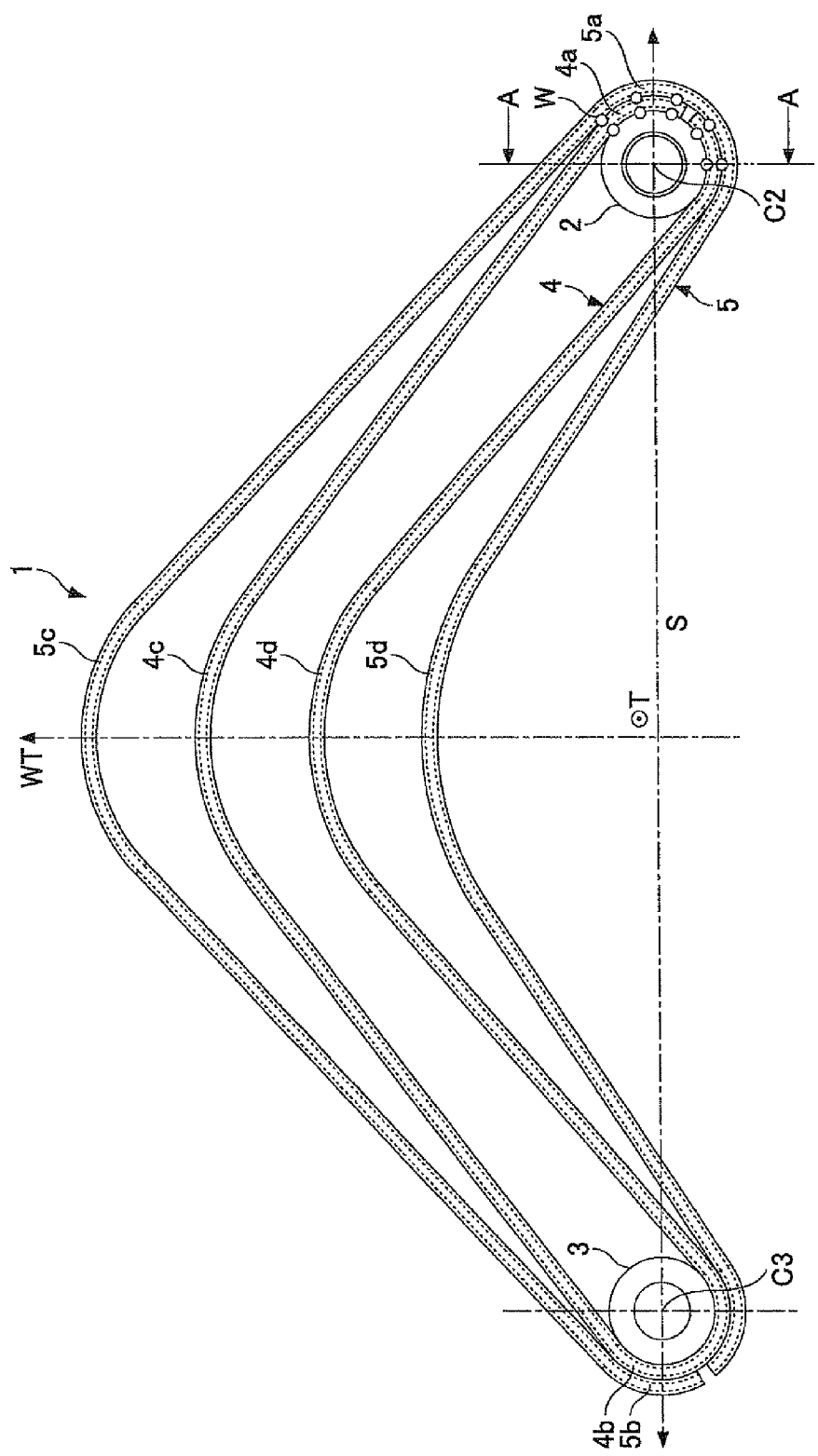
FIG. 2 is a plan view of the curved spring which is the embodiment 1.

For convenience of explanation, a direction from the backside of paper toward the front side of paper is set as positive with respect to the thickness direction T, and an upward direction is set as positive also with respect to the width direction WT. FIG. 2 illustrates the curved spring 1 of FIG. 1 viewing from the thickness direction T wherein a positional relationship in the left-right direction is reversed.

As illustrated in FIG. 2, the curved spring 1 is extended so that the center-axis line C2 of the ring 2 and the center-axis line C3 of the ring 3 are parallel to each other and are oriented in the thickness direction T, and the ring 2 and the ring 3 are arranged in the same one plane which is perpendicular to both the center-axis lines C1 and C2.

The curved spring 1 of the present embodiment 1 constitutes a curved spring, which generates an urging force in a separating direction to separate the ring 2 and the ring 3 from each other based on a relative proximity displacement of the ring 2 and the ring 3 in the approach/separation direction S.

The curved spring 1 bends to form a convex curved surface toward the upward direction in FIG. 2 between the ring 2 and the ring 3, that is, in the width direction WT. In addition, as illustrated in FIG. 2, the curved spring 1 includes a linear spring 4 (linear elastic body) extending on double L-letter-like closed curve lines, which includes a one direction part 4a forming a semi-circular arc along a circumferential direction of the ring 2 and the other-side portion 4b forming a semi-circular arc along a circumferential direction of the ring 3 so as to form two lines of elastic sections 4c and 4d between the one-side portion 4a and the other-side portion 4b.

Namely, the closed curve line contained in the linear spring 4 forms a configuration which defines a boomerang shaped space, as illustrated in FIG. 2, the configuration being formed by connecting the left ends of the inner side bent L-letter shape (elastic section 4d) and the outer side bent L-letter shape (elastic section 4c), which are arranged in parallel with an interval therebetween, in the width direction WT to each other by the semi-circular arc (one-side portion 4a) and connecting the right ends thereof to each other by the semi-circular arc (other-side portion 4b).

Furthermore, as illustrated in FIG. 2, the curved spring 1 includes a linear spring 5 (linear elastic body) extending on double L-letter-like closed curve lines, which includes a one direction part 5a forming a semi-circular arc along a circumferential direction of the ring 2 and the other-side portion 5b forming a semicircular arc along a circumferential direction of the ring 3 so as to form two lines of elastic sections 5c and 5d between the one-side portion 5a and the other-side portion 5b.

Namely, the closed curve line contained in the linear spring 5 also forms a configuration which defines a boomerang shaped space, as illustrated in FIG. 2, the configuration being formed by connecting the left ends of the inner side bent L-letter shape (elastic section 5d) and the outer side bent L-letter shape (elastic section 5c), which are arranged in parallel with a larger interval therebetween, in the width direction WT to each other by the semi-circular arc (one-side portion 5a) and also connecting the right ends thereof to each other by the semi-circular arc (other-side portion 5b).

In addition, the linear springs 4 and 5 are formed by bending a linear material, which is a linear or rolled mother material made of, for example, a spring steel by an apparatus which is, for example, a combination of a bending apparatus and a reverse bending apparatus having a reverse positional relationship with the bending apparatus.

Each of the linear springs 4 and 5 makes a configuration including a convex form at three positions and a concave form at one position along one round of the closed curve line viewing from the inner side of the closed curve line. The convex form is bent by the bending apparatus, and the concave form is bent by the reverse bending apparatus. That is, four bending processes are needed to form the linear springs 4 and 5 of the present embodiment 1.

In addition, because each of the linear springs 4 and 5 is formed from a single piece of linear material, each of the linear springs 4 and 5 has opposite ends and includes a discontinuous portion at either position on the closed curve line. In the present embodiment 1, the discontinuous portion of the liner spring 4 is positioned on the outer circumferential surface of the ring 2 on the outer side of the approach/separation direction S, and the discontinuous portion of the liner spring 5 is positioned on the outer circumferential surface of the ring 3 on the outer side of the approach/separation direction S.

That is, the discontinuous positions are caused to be positioned always between adjacent welding points W and not positioned inside the elastic sections due to the positional relationship between the discontinuous positions and the welding points W and in the circumferential direction of the rings 2 or 3. Moreover, the closed curves line in the present embodiment 1 indicates a configuration in which the center-axis line at one end and the center-axis line at the other end are almost coincident with each other, and indicates a curved line extending in a double L-letter form within the same one plane.

Figure 3:
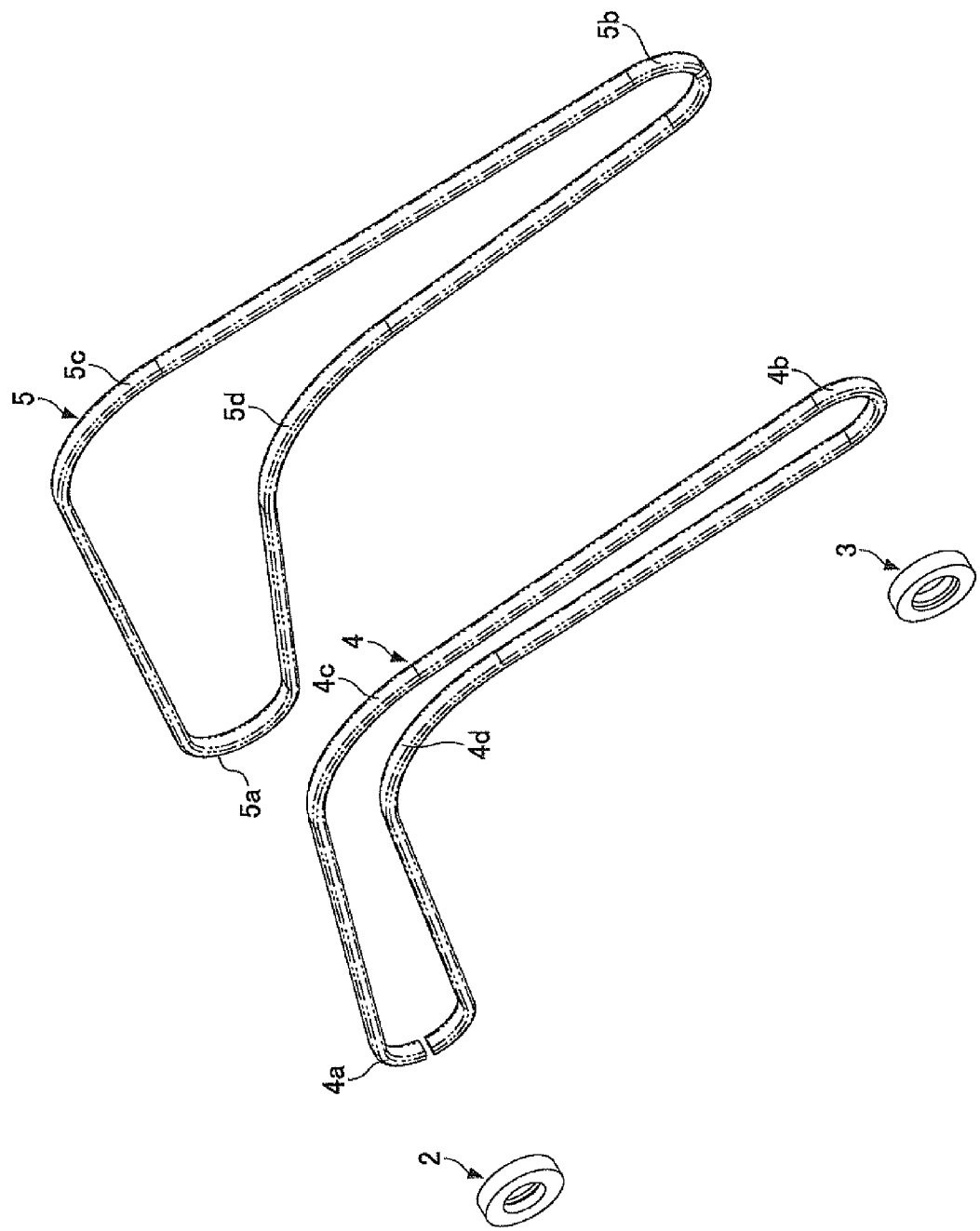
FIG. 3 is an exploded perspective view of the curved spring which is the embodiment 1.

As mentioned above, the curved spring 1 includes two linear elastic bodies so that the linear spring 4, which is one of the linear elastic bodies, forms an inner circumference side linear elastic body which contacts with the outer circumferential surfaces of the ring 2 and the ring 3, and the linear spring 5, which is the other of the linear elastic bodies, forms an outer circumference side linear elastic body which is positioned on the outer circumference side of the linear spring 4. Arranging the above-mentioned structural elements constituting the curved spring 1 of the present embodiment 1 in parallel in the thickness direction T results as illustrated in FIG. 3.

When assembling the curved spring 1 of the present embodiment 1, for example, the linear spring 5 is placed on a placement table or a work table, which is not illustrated in the figure, and the linear spring 4 is placed inside the linear spring 5. Further, the ring 2 is placed so that the outer circumferential surface of the ring 2 is caused to extend along the semicircular arc formed by the one-side portion 4a of the linear spring 4, and the ring 3 is placed so that the outer circumferential surface of the ring 2 is caused to extend along the semicircular arc formed by the other-side portion 4b of the linear spring 4. The order of placing each of the structural elements may be changed arbitrarily.

In a state where they are placed as mentioned above, the structural elements are put in a mutual positional relationship illustrated in FIG. 2. Here, the inner circumferential surface of the one-side portion 4a having a semicircular arc form included in the linear spring 4 is joined to the outer circumferential surface of the ring 2 by, for example, welding at equally-spaced five welding points W indicated by open circles on the circumference in FIG. 2. Also the outer circumferential surface of the one-side portion 4a having a semicircular arc form included in the linear spring 4 is joined to the inner circumferential surface of the one-side portion 5a having a semicircular arc form included in the linear spring 5 by, for example, welding at equally-spaced five welding points W indicated by open circles on the circumference in FIG. 2.

Figure 4:
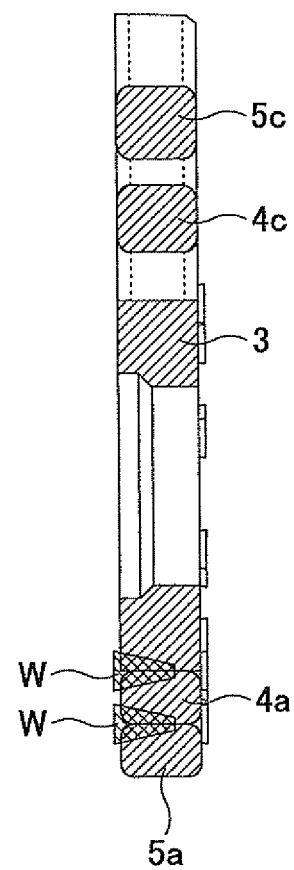
FIG. 4 is a cross-sectional view of the curved spring which is the embodiment 1 taken along a line A-A in FIG. 2.

FIG. 4 illustrates the cross section A-A of FIG. 2. FIG. 4 exemplary illustrates the welding points W illustrated in FIG. 2 including the welding point W positioned on the most clockwise side on the circumference. The left side of an inner cylindrical part of the ring 3 has a taper surface which engages with a top portion of a pin for fixing the ring 3 to a slide mechanism mentioned later.

Welding is carried out with respect to a portion positioned at a leftmost position in FIG. 4 in a contact portion where the outer circumferential surface of the ring 3 is in contact with the inner circumferential surface of the one-side portion 4a of the linear spring 4. Similarly, welding is carried out with respect to a portion positioned at a leftmost position in FIG. 4 in the contact portion where the outer circumferential surface of the one-side portion 4a of the linear spring 4 is in contact with the inner circumferential surface of the one-side portion 5a of the linear spring 5.

As illustrated in FIG. 1, the inner circumferential surface of an other-side portion 4b having a semicircular arc form included in the linear spring 4 is joined to the outer circumferential surface of the ring 3 by welding at welding points W indicated by open circles in FIG. 1. Similarly, the outer circumferential surface of the other-side portion 4b having a semicircular arc form included in the linear spring 4 is joined to the inner circumferential surface of the other-side portion 5b having a semicircular arc form included in the linear spring 5 by welding.

Although the curved spring 1 of the present embodiment 1 contains four lines of the elastic sections 4c, 4d, 5c and 5d, an arbitrary combination of the elastic sections from among those elastic sections makes a bent form which is bent in the same direction mutually, that is, the upward direction in FIG. 1.

A width of an air gap part formed between the elastic section 5c, which is located at the outermost side of bent, and the elastic section 4c, which is at the second position from the outermost side, in the width direction WT is set smaller as a distance from the center in the approach/separation direction S is larger. A width of an air gap part formed between the elastic section 5d, which is positioned at the innermost side of bent, and the elastic section 4d, which is at the second position from the innermost side, in the width direction WT is set smaller as a distance from the center in the approach/separation direction S is larger. A width of an air gap part formed between the elastic section 4c, which is at the second position from the outer side of bent forming the linear spring 4, and the elastic section 4d, which is at the third position, in the width direction WT is set smaller as a distance from the center is smaller.

Figure 5A:
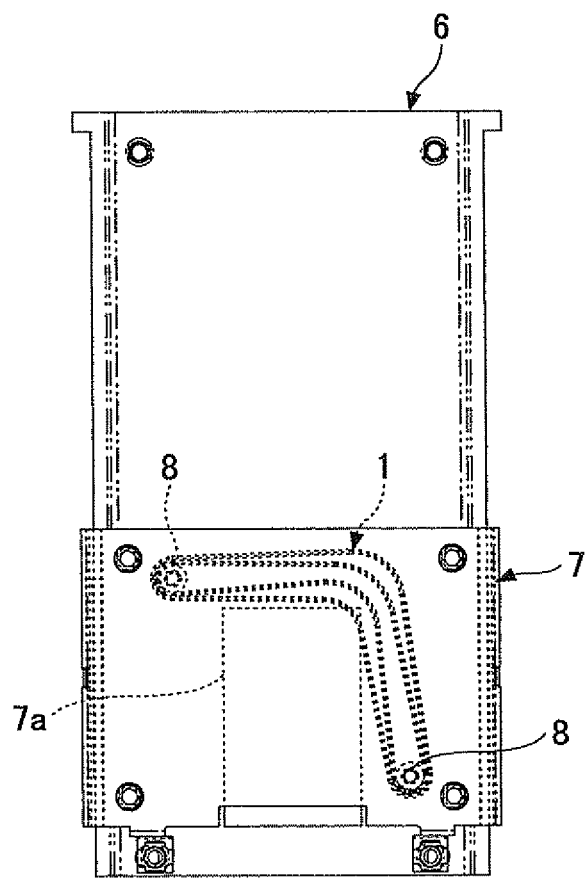
FIG. 5A is a plan view illustrating a closed state of a slide mechanism to which the curved spring which is the embodiment 1 is applied.
Figure 5B:
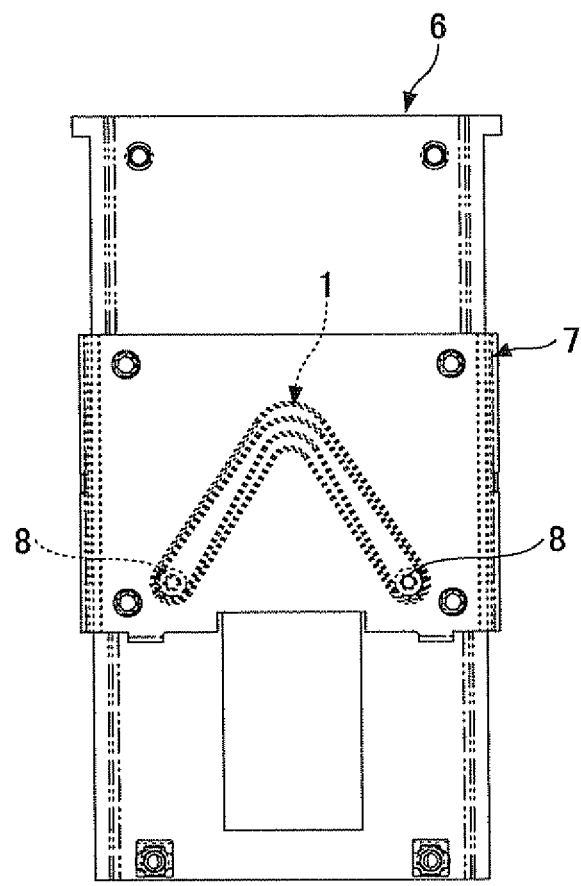
FIG. 5B is a plan view illustrating a neutral state of the slide mechanism to which the curved spring which is the embodiment 1 is applied.
Figure 5C:
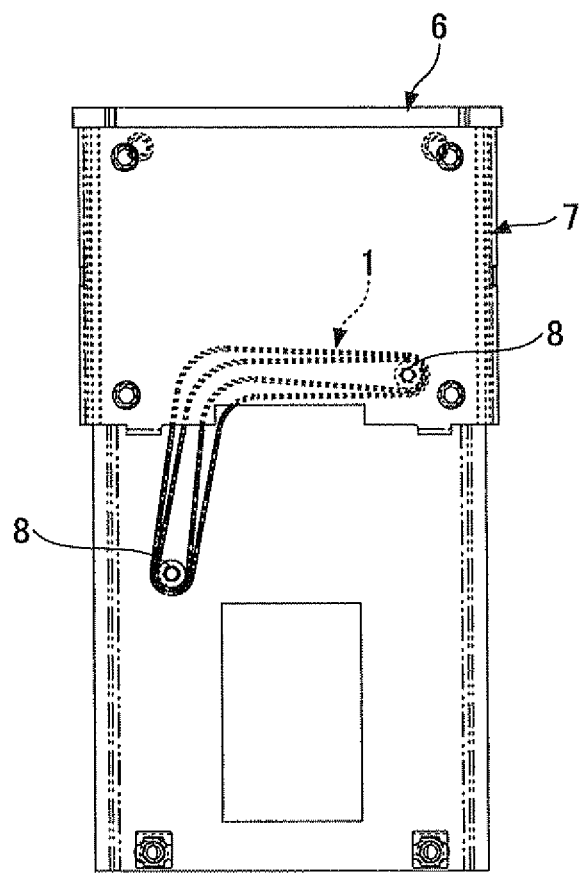
FIG. 5C is a plan view illustrating an open state of a slide mechanism to which the curved spring which is the embodiment 1 is applied.

The curved spring 1 of the present embodiment 1 described above is preferably applicable to a slide mechanism described below. As illustrated in FIGS. 5A-5C, the slide mechanism to which the curved spring 1, which is a resin spring, of the present embodiment 1 is applied includes a base plate 6 (base board), a slide plate 7 (slide board), and two pins 8 for attaching the curved spring 1. The base plate 6 is a rectangular and planar member, and is formed of, for example, a stainless steel. In each figure, a rail is formed along each of the longer sides of the base plate 6, the longer sides being end portions of both left and right sides in the figures.

The slide plate 7 is formed into a rectangular shape of which shorter sides extend in a slide direction with respect to the base plate 6. The slide direction here corresponds to an extending direction of the longer sides of the base plate 6. The slide plate 7 also has a rectangular and planar shape, and is provided with bent parts formed on the ends on the left and right sides in FIGS. 5A-5C, the bent parts once extending toward the backside of the paper and, then, directed inward in left and right directions. An outer side surface of one of a pair of guides, which is not illustrated in the Figures, is engaged with and attached to an inner surface of a cavity space formed by the respective bent parts.

The guide is formed of, for example, a resin, etc., in order to provide good slidability relative to the above mentioned rail. Grooves are formed on surfaces of the pair of guides, which surfaces face leftward and rightward, respectively, so that the grooves are brought into engagement with the respective rails formed on the base plate 6.

The slide plate 7 is slidable with respect to the base plate 6 in the upward and downward directions in FIGS. 5A-5C by the pair of guides being brought into engagement with the pair of rails, respectively. The ring 2 of the curved spring 1 of the embodiment 1 is rotatably connected to the slide plate 7 by one of the pins 8, and the ring 3 of the curved spring 1 of the embodiment 1 is rotatably connected to the base plate 7 by the other of the pins 8.

FIG. 5A illustrates a closed position where the slide plate 7 is located at a lowermost position with respect to the base plate 6 in FIG. 4. FIG. 5C illustrates an open position where the slide plate 7 is located at an uppermost position with respect to the base plate 6 in FIG. 4. FIG. 5B illustrates a neutral position in the middle of sliding from the closed position to the open position.

The curved spring 1 exhibits the form illustrated in FIG. 1 in a no-load state where no load is applied. In a state where the curved spring 1 is assembled to the slide apparatus through the pins 8 and is set in either the closed position illustrated in FIG. 5A or the open position illustrated in FIG. 5C, the curved spring 1 is bent and deformed such that a length in the approach/separation direction S is slightly reduced.

When the slide plate 7 is displaced from the closed position illustrated in FIG. 5A or the open position illustrated in FIG. 5C to the neutral position illustrated in FIG. 5B, the curved spring 1 is further bent and deformed to be in a most bent state of a V-letter form. The widths of the air gap spaces in the no-load state of FIG. 1 and an elastic coefficient of each of the elastic sections 4c, 4d, 5c and 5d of the curved spring 1 are set so that the widths of the air gap spaces do not become zero in the most bent state and no interference is generated between the adjacent elastic sections.

According to the above-mentioned curved spring 1 and slide mechanism of the present embodiment 1, the following action and effect can be acquired. That is, because the slide plate 7 and the base plate 6 are coupled to each other by the curved spring 1 of the present embodiment 1, a diametral size of a portion connected to each pin 8 can be reduced in cases where any two of the open position, the closed position and the neutral position illustrated in FIGS. 5A-5C are selected and state transition is carried out.

Figure 6A:
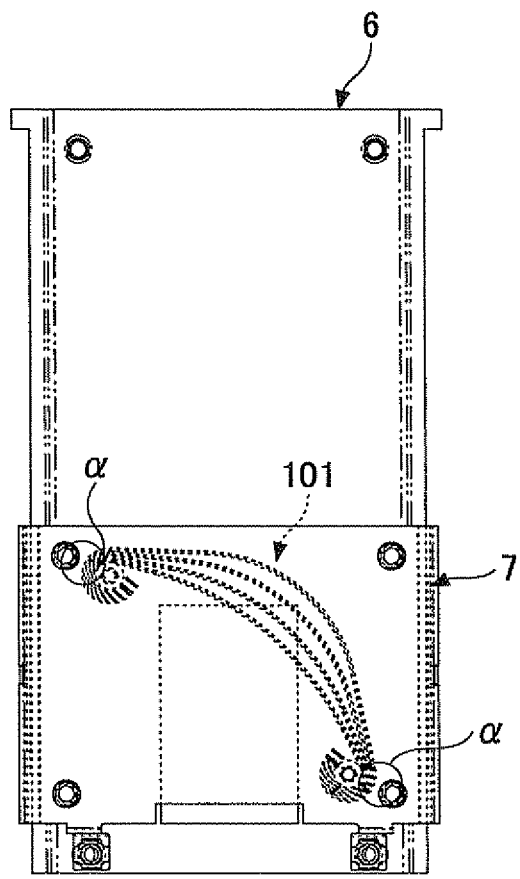
FIG. 6A is a plan view illustrating a closed state of a slide mechanism to which a curved spring which is a comparative example is applied.
Figure 6B:
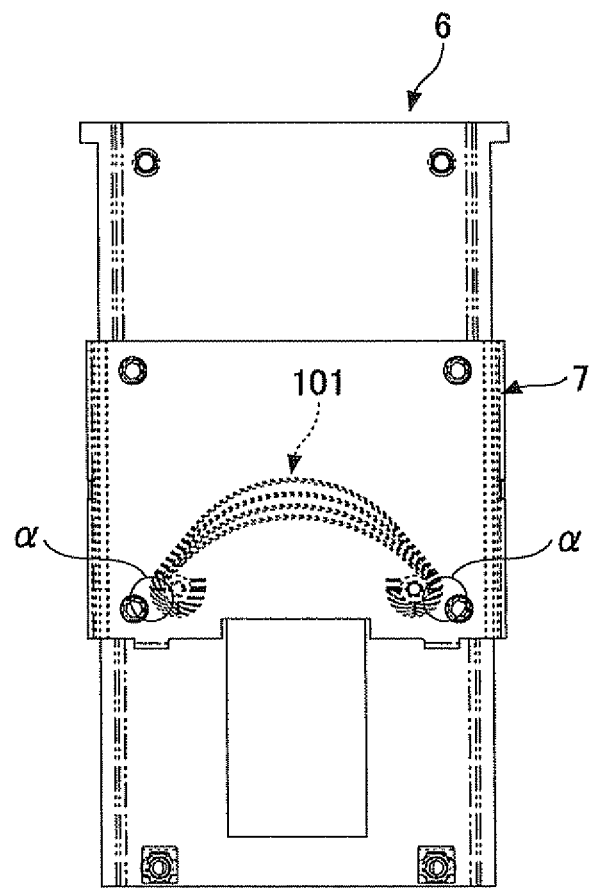
FIG. 6B is a plan view illustrating a neutral state of the slide mechanism to which the curved spring which is the comparative example is applied.
Figure 6C:
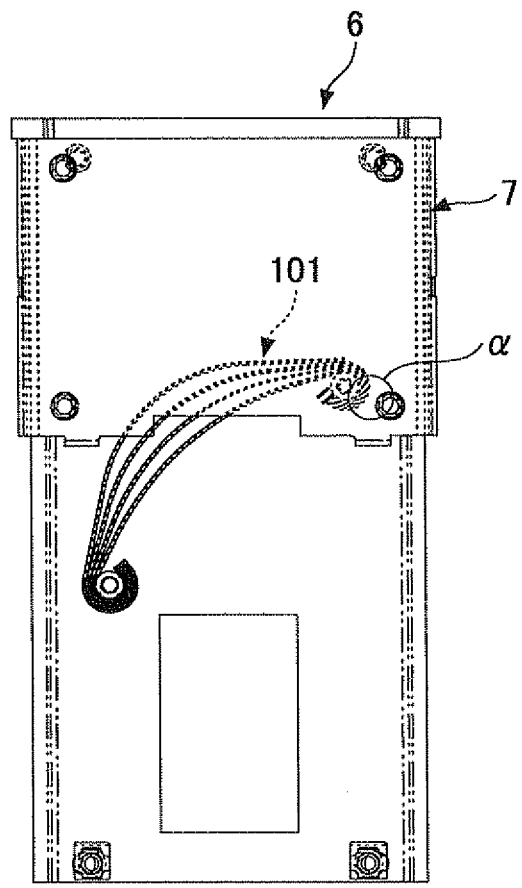
FIG. 6C is a plan view illustrating an open state of the slide mechanism to which the curved spring which is the comparative example is applied.

Here, for the sake of reference, a spring 101 as a comparative example and a slide mechanism using the spring 101 are illustrated in FIGS. 6A-6C, the spring being formed by overlapping opposite ends of four lines of linear springs, which have a simply bent form and do not form a closed curve, on the outer circumferential surfaces of the ring 2 or 3 in a diametral direction. FIG. 6A illustrates a closed position, and FIG. 6C illustrates an open position. FIG. 6B illustrates a neutral position in the middle of the way from the closed position to the open position.

That is, in the spring 101 of the conventional technology, as illustrated within circles indicated by a in each of FIGS. 6A-6C, the outer diameter size of a portion connected to each pin 8 is larger than an outer diameter size of the ring by four times the thickness of the linear spring in the diametral direction, which may cause a problem of interference with the slide mechanism and other parts in the periphery of the slide mechanism. However, according to the curved spring 1 of the present embodiment 1, the outside dimension of the curved spring 1 can be larger than the outer diameter of the ring 2 or 3 by twice the thickness of the linear spring 4 or 5. That is, the outside dimension of the curved spring 1 can be smaller than that of the spring 101 of the conventional technology. Thereby, interference with the slide mechanism and other parts can be suppressed as much as possible.

In addition, in the spring 101 of the conventional technology, in order to maintain an interval between elastic sections at the closed position illustrated in FIG. 6A when arranging four lines of elastic section, which contribute to generation of an urging force, in a direction from outside of the bent toward inside of the bent, a degree of bent of the elastic sections positioned on the inner side must be smaller than that of the elastic sections positioned on the outer side. Accordingly, a degree of bent of the elastic section at the innermost position is smallest, which results in a large amount of inward protrusion of the elastic sections, thereby causing a problem of interference with FPC and harness, which is simply illustrated by a dotted rectangle in the center portion of FIG. 6A.

However, in the curved spring 1 of the present embodiment 1, as already stated, the elastic sections 5c, 4c, 4d and 5d are arranged in the form of combination of two closed curves. Thereby, the necessity of reducing the degree of bending of the elastic section positioned on the inner side to be smaller than that of the elastic section positioned on the outer side can be eliminated. For this reason, a degree of bending can be increased also in the elastic section 5d located at an innermost position and an amount of inward protrusion can be reduced, which results in prevention of interference with FPC and harness illustrated by a dashed rectangle in the center of FIG. 5A.

In addition, in the present embodiment 1, the elastic sections 5c and 5d are formed by the linear spring 5 constituting an outer circumference side linear elastic body in a form of a closed curve which is a combination of two L-letter forms generally parallel with each other and semicircular arcs on both ends. Moreover, the elastic sections 4c and 4d are formed by the linear spring 4 constituting an outer circumference side linear elastic body in a form of a closed curve which is a combination of two L-letter forms of which distance therebetween in the width direction WT becomes shorter as it goes closer to the center in the approach/separation direction S.

For this reason, in the curved spring 1 of the present embodiment 1, the center portion in the approach/separation direction is prevented from expanding in the width direction WT at all of the closed position illustrated in FIG. 5A, the open position illustrated in FIG. 5C and the neutral position illustrated in FIG. 5B. Accordingly, the curved spring 1 can be formed in generally parallel two L-letter forms, and, thereby, a degree of freedom of arrangement can be increased with respect to the spring 101 of the conventional technology illustrated in FIG. 6B.

Further, in the spring 101 of the conventional technology, it is difficult to maintain a profile irregularity of the spring 101 due to mutual welding of four lines of the linear springs by overlapping in the radial direction. Thus, in association with a displacement of the spring 101, there is a problem in that especially a "repercussion" tends to generate, which enlarges a displacement of the center portion along the approach/separation direction in the thickness direction.

In the curved spring 1 of the present embodiment 1, the number of pieces of the linear springs 4 and 5 stacked in the radial direction of the ring 2 or 3 is reduced to a half, and further the linear springs 4 and 5 of a single closed curve form constitute the respective two elastic sections 4c and 4d and 5c and 5d, thereby reducing the number of welding points in the radial direction. Thus, it is possible to make an operation of increasing the surface rigidity and maintaining the profile irregularity easier.

Because the two elastic sections 4c and 4d included in the same linear spring 4 are formed without welding each other, and the two elastic sections 5c and 5d included in the same linear spring 5 are formed without welding each other, the surface rigidity is further increased and a high profile irregularity can be maintained.

For this reason, in the curved spring 1 of the present embodiment 1, in a case where a load is applied in a direction in which the ring 2 and the ring 3 of the curved spring 1 approaches each other, and a deformation of protruding outward is generated in the curved spring 1, a "repercussion", which is a protruding deformation of the vicinity of the center portions of the elastic sections 4c, 4d, 5c and 5d in the approach/separation direction S from the same plane containing the ring 2 and the ring 3, can be effectively prevented.

That is, in the curved spring 1 of the present embodiment 1, the above-mentioned "repercussion" is effectively prevented and the bent deformation and the elastic deformation are generated within the initially-set same plane, and, in this point of view, a possible interference with the slide mechanism and other parts in the electronic equipment to which the slide mechanism is applied can be prevented more effectively.

Moreover, the thickness of the curved spring 1 of the present embodiment in the thickness direction T can be thinner than a conventional torsion spring, an interference with the above-mentioned other parts can also be prevented in this point of view. Concurrently, in association with sliding of the slide plate 7, especially, the thickness of the internal space previously set to allow the displacement and the bent deformation of the curved spring 1 can be reduced. Thereby, sizes of both the slide mechanism and the electronic equipment in the thickness direction T can be reduced, and a mount density can also be increased.

As mentioned above, in addition to the remarkable and advantageous effect that a higher degree of freedom of arrangement is acquired in mounting than the conventional spring, the curved spring 1 of the present embodiment 1 has the following advantageous effects in a manufacturing process. A description will be given below of such advantageous effects.

As already stated, because the curved spring 1 of the present embodiment 1 can constitute the elastic sections 5c, 4c, 4d and 5d of four lines by two springs, which are the inside linear spring 4 and the outside linear spring 5, a number of parts can be reduced and a number of assembling processes of the curved spring 1 can be reduced.

In addition, also in each manufacturing process of the linear spring 4 and the linear spring 5, each of the linear springs 4 and 5 can be formed by performing four times of bending work, which results in eight times of bending process for the entire curved spring 1. As compared to this, the above-mentioned spring 101 requires three times of bending work for forming one spring, which bending work includes forming curling portions on both ends and forming a bent portion at the center in the approach/separation direction, which results in that a total of twelve times of bending work is required for forming the entire curved spring 1. For this reason, according to the curved spring 1 of the present embodiment 1, the number of times of bending work can be reduced to about two thirds. Thereby, it is possible to attempt a cost reduction by shortening the manufacturing process.

Furthermore, with respect to the number of welding points in the curved spring 1, the number of welding points can be a total of twenty points for the entire curved spring 1, the total of twenty points being calculated by doubling five points on the circumference and, then, multiplying the doubled number of points (ten) by two because the welding is performed in both the approach direction and the separation direction. On the other hand, the above-mentioned spring 101 requires a total of forty welding points, which is calculated by quadruplicating five points on the circumference and, then, multiplying the quadruplicated number of points (twenty) by two. Thus, the number of welding processes of the curved spring 1 of the present embodiment 1 can be reduced to about one half. Thereby, it is also possible to attempt a cost reduction by shortening the manufacturing process.

Although the longer side direction of the base plate 6 corresponds the top-to-bottom direction of FIG. 5 in the slide mechanism of the present embodiment 1, if the base plate 6 has a shape in which a length in the slide direction is shorter than a length in the left-to-right direction in FIG. 5, the longitudinal direction may correspond to the shorter side direction.

Although the curved spring 1 of the embodiment 1 mentioned above includes the elastic sections 4c, 4d, 5c and 5d of four lines, the curved spring 1 may include elastic sections of six lines or elastic sections of two lines instead of the elastic sections of four lines, and the number of lines of elastic sections may be set arbitrarily. Especially, in changing a load, a fine adjustment can be set easily by changing a cross-sectional area of the elastic sections. Here, the cross-sectional shape can be various shapes such as a rectangular shape, an elliptic shape, a circular shape, etc.

Although, in the embodiment 1 mentioned above, all of one ends and the other ends of the linear springs 4 and 5 constituting the curved spring 1 are arranged outside the approach/separation direction S, the one end and the other end of the linear spring 4 may be arranged inside the approach/separation direction S. A description will be given below of an embodiment 2 concerning the above. In the embodiment 2, descriptions of characteristic items common to the embodiment 1 may be omitted or simplified.

EMBODIMENT 2

As illustrated in FIG. 7, the curved spring 11 of the present embodiment 2 contains rings 2 and 3, a linear spring 14 and a linear spring 15. The inner circumferential surface of a one-side portion 15a of a circular arc form extends along and contacts an outer circumferential surface of the ring 2 on an outer side in the approach/separation direction S. The inner circumferential surface of the other-side portion 15b of a circular arc form extends along and contacts an outer circumferential surface of the ring 3 on an outer side in the approach/separation direction S.

The one-side portion 14a of the linear spring 14 makes a partial circular arc form, which protrudes toward an inner side in the approach/separation direction S. The inner circumferential surface of the one-side portion 14a extends along and contacts an outer circumferential surface of the ring 2 on an inner side in the approach/separation direction S. The other-side portion 14b of the linear spring 14 makes a partial circular arc form, which protrudes toward an inner side in the approach/separation direction S. The inner circum circumferential surface of the other-side portion 14b extends along and contacts an outer circumferential surface of the ring 3 on an inner side in the approach/separation direction S.

The one-side portion 15a and the other-side portion 15b included in the linear spring 15, which is an outer side linear elastic body, are joined to the outer circumferential surfaces of the ring 2 and the ring 3, respectively, at four welding points WO on the circumference. The one-side portion 14a and the other-side portion 14b included in the linear spring 14, which is an inner side linear elastic body, are joined to the outer circumferential surfaces of the ring 2 and the ring 3, respectively, at two welding points WI on the circumference.

Furthermore, the boundary portions between the one-side portion 14a and each of the elastic sections 14c and 14d of the linear spring 14 are joined to the respective elastic sections 15c and 15d of the linear spring 15 at welding points WS. Similarly, the boundary portions between the other-side portion 14b and each of the elastic sections 14c and 14d of the linear spring 14 are joined to the respective elastic sections 15c and 15d of the linear spring 15 at welding points WS.

According to the curved spring 11 of the present embodiment 2, the same action and effect as that obtained from the curved spring 1 explained in the embodiment 1 can be obtained. In addition, because a number of laminations of the linear springs 4 and 5 in the radial direction of the ring 2 and the ring 3 can be further reduced from two to one, the effect of preventing a "repercussion" by maintaining the profile irregularity and the effect of increasing the degree of freedom of arrangement can be further increased.

In addition, as compared to the embodiment 1, the number of welding points can be reduced from twenty to sixteen, thereby further reducing the number of welding processes. As compared to the linear spring 4 of the embodiment 1, the linear spring 14 includes a convex form at five positions and a concave form at three positions when viewing from an inner side of the closed curve. Thus, from the view point of reduction in the number of bending processes, the embodiment 1 is advantageous. Moreover, because the embodiment 2 causes a radius of convex form at for positions to become small, the convex form corresponding to the above-mentioned boundary portion, from among five convex forms, the embodiment 1 is advantageous in the point of view that the embodiment 1 does not cause a difficulty in manufacturing due to a reduced radius of the convex form.

Figure 8:
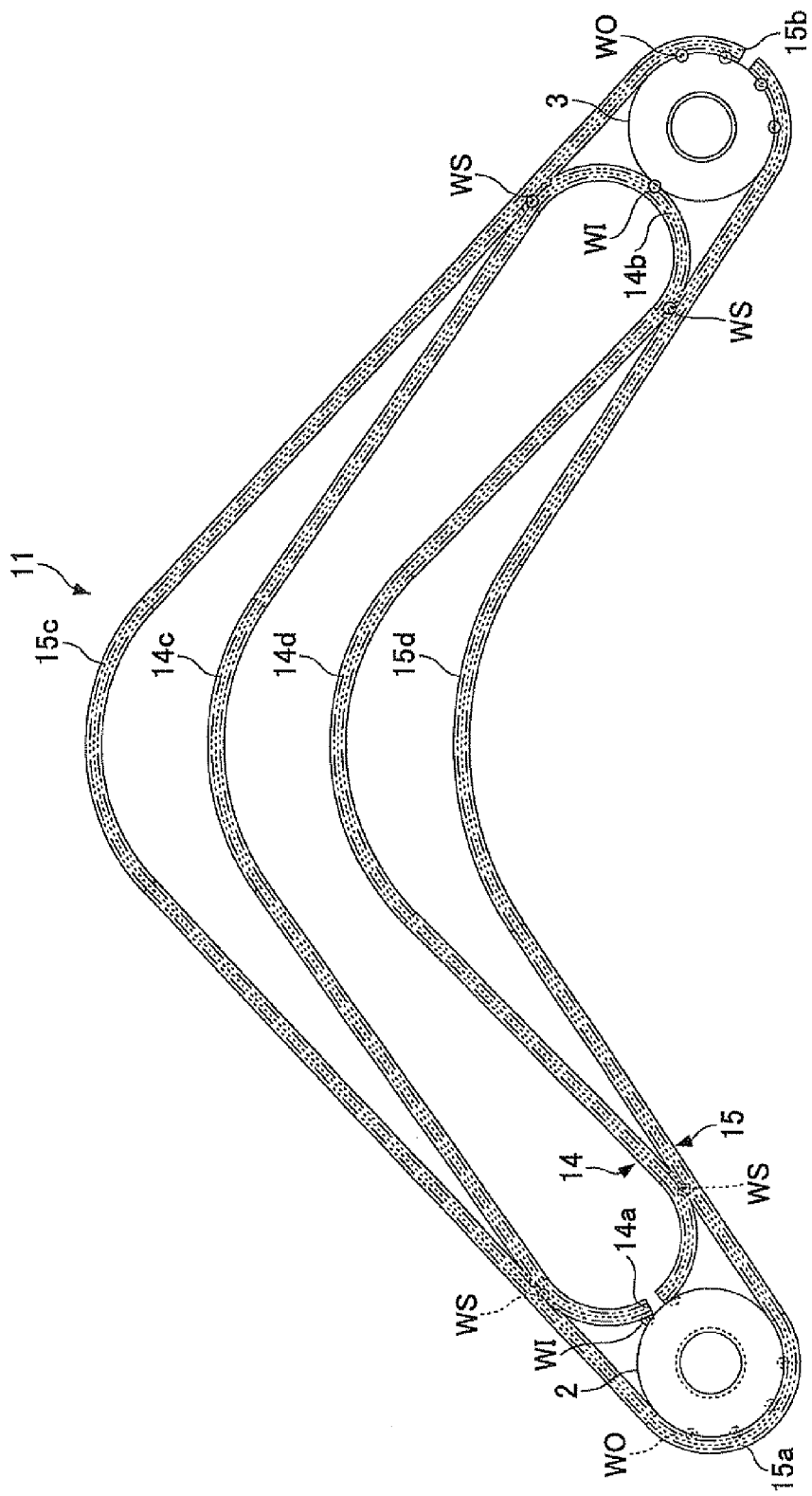
FIG. 8 is a plan view illustrating another mode of the curved spring which is the embodiment 2.

In order to prevent the difficulty in manufacturing from arising, the linear spring 14 may be in a form illustrated in FIG. 8 instead of the form illustrated in FIG. 7. As illustrated in FIG. 7, the one-side portion 14a of the linear spring 14 according to a variation of the present embodiment 2 forms a semicircular arc, which protrudes toward the outer side in the approach/separation direction S and contacts the ring 2. The other-side portion 14b of the linear spring 14 forms a semicircular arc, which protrudes toward the outer side in the approach/separation direction S.

The one-side portion 15a and the other-side portion 15b included in the linear spring 15, which is an outer side linear elastic body, are joined to the outer circumferential surfaces of the ring 2 and the ring 3, respectively, at four welding points WO on the circumference. The one-side portion 14a included in the linear spring 14, which is an inner circumference side elastic body, includes a discontinuous portion in the present variation. Using the discontinuous portion, the one-side portion 14a is joined to the ring 2 at two welding points WI on the circumference. The other-side portion 14b is joined to the ring 3 at a single welding point WI on the circumference.

Furthermore, the boundary portions between the one-side portion 14a and each of the elastic sections 14c and 14d of the linear spring 14 are joined to the respective elastic sections 15c and 15d of the linear spring 15 at welding points WS. Similarly, the boundary portions between the other-side portion 14b and each of the elastic sections 14c and 14d of the linear spring 14 are joined to the respective elastic sections 15c and 15d of the linear spring 15 at welding points WS.

According to the present variation, the difficulty in manufacturing can be prevented from being arisen by preventing the radius of the convex form from being small. However, because the lengths of the elastic sections 14c and 14d formed by the linear spring 14 in the approach/separation direction S are reduced, it is desirable to appropriately perform an adjustment, when setting a spring constant, such that, for example, the cross-sectional area of the linear spring 14 is set smaller than the cross-sectional area of the linear spring 15.

Although the structure in which the ring 2 and the ring 3 are essential has been explained in the above-mentioned embodiments 1 and 2, a form of eliminating the ring 2 and the ring 3 may be achieved by constructing one-side bearing section and the other-side bearing section by a combination of one-side ends of the linear springs 4 and 5 and a combination of the other-side ends by applying the form explained in the embodiment 2. A description will be given below of an embodiment 3 concerning the above. Also in the embodiment 3, descriptions of characteristic items common to the embodiment 1 or 2 are omitted or simplified.

EMBODIMENT 3

As illustrated in FIG. 9, the curved spring 21 of the present embodiment 3 generates an urging force in a separation direction in which one-side bearing section 22 and the other-side bearing section 23 are separated from each other based on a relative approach/displacement in the approach/separation direction between the one-side bearing section 22 and the other-side bearing section 23. In the present embodiment 3, the one-side bearing section 22 is constituted by the one-side bearing portion 24a of the linear spring 24 and the one-side bearing portion 25a of the linear spring 25, and the other-side bearing section 23 is constituted by the other-side bearing portion 24b of the linear spring 24 and the other-side bearing portion 25b of the linear spring 25.

The linear spring 24, which constitutes an inner circumference side linear elastic body, extends on a closed curve including the one-side bearing portion 24a and the other-side bearing portion 24b, to form two lines of elastic sections 24c and 24d between the one-side bearing portion 24a and the other-side bearing portion 24b, the one-side bearing portion 24a being a portion of the one-side bearing section 22 on the inner side in the approach/separation direction S, the other-side bearing portion 24b being a portion of the other-side bearing section 23 on the inner side in the approach/separation direction S.

The linear spring 25 located on the outer circumference side of the linear spring 24 constitutes an outer circumference side linear elastic body. The linear spring 25 extends on a closed curve including the one-side bearing portion 25a and the other-side bearing portion 25b to form two lines of elastic sections 25c and 25d between the one-side bearing portion 25a and the other-side bearing portion 25b, the one-side bearing portion 25b being a portion of the one-side bearing section 22 on the inner side in the approach/separation direction S, the other-side bearing portion 25b being a portion of the other-side bearing section 23 on the inner side in the approach/separation direction S.

As illustrated in FIG. 9, the curved spring 21 of the present embodiment 3 includes almost the same structure as the curved spring of the embodiment 2 illustrated in FIG. 7. However, because the curved spring 21 does not include the ring 2 and the ring 3, both the one-side bearing portion 24a and the other-side bearing portion 24b of the linear spring 24 and both the one-side bearing portion 25a and the other-side bearing portion 25b of the linear spring 25 are not joined to the rings.

For this reason, in both the elastic sections 24c and 24d of the linear spring 24, an adjacent portion close to the one-side bearing portion 24a and the other-side bearing portion 24b is arranged along the elastic sections 25c and 25d of the linear spring 2 in parallel, and the adjacent portion 24e is joined to the linear spring 25 at two welding points WS.

According to the curved spring 21 of the present embodiment 3, a number of parts can be further reduced because the rings 2 and 3 are not used as indispensable parts. In addition, because the rings 2 and 3 are made unnecessary, a number of welding points is reduced thereby allowing further simplification of the manufacturing process.

Although the preferred embodiments were described in detail above, the present invention is not limited to the above-mentioned embodiments, and various variations and substitutions may be applied to the above-mentioned embodiments without departing from the scope of the present invention.

For example, the above-mentioned welding may be of a contact type or a non-contact type, and a method of various forms may be used if it is a method by which parts having relatively small outer dimensions can be welded appropriately.

For example, although in FIG. 1 the welding points are arranged on the side of the right side ring 3 in the thickness direction T and the welding points are arranged on the side of the left side ring 3 in a direction opposite to the thickness direction T, the sides on which the welding points are arranged may be reversed to each other, and both the sides on which the welding points are arranged may be in the thickness direction T or the both the sides may be in the opposite direction.

Furthermore, the above-mentioned discontinuous portion, that is, the cut portion, is not indispensable. The discontinuous portion may be eliminated by previously joining the pair of ends constituting the discontinuous portion to each other by means such as welding. Moreover, the discontinuous portion may be eliminated beforehand by causing the pair of ends to contact with each other by adjusting the length of the linear elastic body.

In addition, the number of bending works and the rate of reduction in the number of welding points explained in the embodiment 1 are mere examples indicating a degree of reduction. According to the embodiments 1 through 3, other number of processes such as, for example, an arrangement on a placement table may be reduced by reducing the number of parts of the linear spring in association with forming the linear elastic body into a form of a closed curve.

The present international application claims a priority based on Japanese Patent Application No. 2010-191369 filed on Aug. 27, 2010, the entire contents of Japanese Patent Application No. 2010-191369 are incorporated herein by reference.

The invention claimed is:

1. A curved spring comprising:
an inner-side linear elastic body extending on a closed curve, which includes a one-side portion arranged along a circumferential direction of a one-side bearing section and an other-side portion arranged along a circumferential direction of an other-side bearing section so as to constitute elastic sections of two lines between said one-side portion and said other-side portion, wherein the curved spring generates, based on a relative approaching displacement of said one-side bearing section and said other-side bearing section in an approach/separation direction, an urging force in a separation direction in which said one-side bearing section and said other-side bearing section are separated from each other, and
an outer-side linear elastic body extending on a closed curve, which includes a one-side portion arranged along a circumferential direction of the one-side bearing section and an other-side portion arranged along a circumferential direction of the other-side bearing section so as to constitute elastic sections of two lines between said one-side portion and said other-side portion, wherein the curved spring generates, based on a relative approaching displacement of said one-side bearing section and said other-side bearing section in an approach/separation direction, an urging force in a separation direction in which said one-side bearing section and said other-side bearing section are separated from each other,
wherein the inner-side linear elastic body has contact with outer circumferential surfaces of the one-side bearing section and the other-side bearing section, and the outer-side linear elastic body surrounds the inner-side linear elastic body, and
wherein each of the inner-side linear elastic body and the outer-side linear elastic body is formed from a single piece of linear material, has opposite ends, and includes a discontinuous portion in the one-side portion thereof or the other-side portion thereof.

2. The curved spring as claimed in claim 1, comprising two pieces of said linear elastic body, wherein one of the linear elastic bodies is an inner side linear elastic body, which is brought into contact with circumferential surfaces of said one-side bearing section and said other-side bearing section, and the other of said linear elastic bodies is an outer side linear elastic body located on an outer circumference side of said inner side linear elastic body.

3. The curved spring as claimed in claim 2, wherein said one-side portion and said other-side portion included in said inner side linear elastic body are joined to the outer circumferential surfaces of said one-side bearing section and said other-side bearing section.

4. The curved spring as claimed in claim 3, wherein said one-side portion and said other-side portion included in said inner side linear elastic body are joined to said one-side portion and said other-side portion included in said outer circumference side elastic body.

5. The curved spring as claimed in claim 3, wherein said one-side portion and said other-side portion included in said outer side linear elastic body are joined to the outer circumferential surfaces of said one-side bearing section and said other-side bearing section.

6. A curved spring comprising:
an inner-side linear elastic body extending on a closed curve, which includes a one-side bearing portion forming a portion of a one-side bearing section and an other-side bearing portion forming a portion of an other-side bearing section so as to constitute elastic sections of two lines between said one-side bearing portion and said other-side baring portion, wherein the curved spring generates, based on a relative approaching displacement of said one-side bearing section and said other-side bearing section in an approach/separation direction, an urging force in a separation direction in which said one-side bearing section and said other-side bearing section are separated from each other, and an outer-side linear elastic body extending on a closed curve, which includes a one-side bearing portion forming a portion of the one-side bearing section and an other-side bearing portion forming a portion of the other-side bearing section so as to constitute elastic sections of two lines between said one-side bearing portion and said other-side baring portion, wherein the curved spring generates, based on a relative approaching displacement of said one-side bearing section and said other-side bearing section in an approach/separation direction, an urging force in a separation direction in which said one-side bearing section and said other-side bearing section are separated from each other, wherein the inner-side linear elastic body has contact with outer circumferential surfaces of the one-side bearing section and the other-side bearing section, and the outer-side linear elastic body surrounds the inner-side linear elastic body, and wherein each of the inner-side linear elastic body and the outer-side linear elastic body is formed from a single piece of linear material, has opposite ends, and includes a discontinuous portion in the one-side portion thereof or the other-side portion thereof.

7. The curved spring as claimed in claim 6, comprising two pieces of said linear elastic body, wherein one of the linear elastic bodies is an inner side linear elastic body and the other of said linear elastic bodies is an outer side linear elastic body located on an outer circumference side of said inner side linear elastic body.

8. The curved spring as claimed in claim 1, wherein said elastic sections make bent forms or curved forms, which are mutually bent in the same direction.

9. A slide mechanism comprising:
said curved spring as claimed in claim 1;
a base plate; and
a slide plate connected to said base plate slidably in a predetermined direction,
where said one-side bearing section of said curved spring is rotatably connected to said other-side bearing section, and said other-side bearing section of said curved spring is rotatably connected to said slide plate.

10. The curved spring as claimed in claim 6, wherein said elastic sections make bent forms or curved forms, which are mutually bent in the same direction.

11. A slide mechanism comprising:
said curved spring as claimed in claim 6;
a base plate; and
a slide plate connected to said base plate slidably in a predetermined direction,
where said one-side bearing section of said curved spring is rotatably connected to said other-side bearing section, and said other-side bearing section of said curved spring is rotatably connected to said slide plate.

* * * * *